United States Patent
Gordon-Duffy et al.

(10) Patent No.: US 9,493,624 B2
(45) Date of Patent: Nov. 15, 2016

(54) POLYMER FOAM WITH LOW BROMINE CONTENT

(75) Inventors: John Gordon-Duffy, La Wantzenau (FR); David R. Arrowsmith, Achern (DE); Simon P. Lee, Midland, MI (US); Ralph Schmidt, Ettlingen (DE)

(73) Assignee: Dow Global Technologies LLC, Midland, MI (US)

( * ) Notice: Subject to any disclaimer, the term of this patent is extended or adjusted under 35 U.S.C. 154(b) by 1234 days.

(21) Appl. No.: 13/139,406

(22) PCT Filed: Jan. 5, 2010

(86) PCT No.: PCT/US2010/020092
§ 371 (c)(1),
(2), (4) Date: Jun. 13, 2011

(87) PCT Pub. No.: WO2010/083068
PCT Pub. Date: Jul. 22, 2010

(65) Prior Publication Data
US 2011/0275730 A1    Nov. 10, 2011

Related U.S. Application Data

(60) Provisional application No. 61/144,767, filed on Jan. 15, 2009.

(51) Int. Cl.
*C08J 9/14* (2006.01)
*C08J 9/00* (2006.01)

(52) U.S. Cl.
CPC .............. *C08J 9/14* (2013.01); *C08J 9/0019* (2013.01); *C08J 9/0061* (2013.01); *C08J 2201/03* (2013.01); *C08J 2203/06* (2013.01); *C08J 2203/14* (2013.01); *C08J 2203/142* (2013.01); *C08J 2325/02* (2013.01); *C08J 2461/00* (2013.01)

(58) Field of Classification Search
CPC .......... C08J 9/0019; C08J 9/0061; C08J 9/14; C08J 2201/03; C08J 2203/06; C08J 2203/14; C08J 2203/142; C08J 2325/02; C08J 2461/00
USPC ............................................. 521/60, 79, 146
See application file for complete search history.

(56) References Cited

U.S. PATENT DOCUMENTS

| 4,272,583 A | 6/1981 | Hahn et al. |
| 6,340,713 B1 * | 1/2002 | Gluck et al. ................ 521/60 |
| 2008/0064774 A1 | 3/2008 | Stobby |
| 2008/0242752 A1 | 10/2008 | Delaviz et al. |
| 2008/0287560 A1 | 11/2008 | Loh et al. |
| 2008/0293839 A1 | 11/2008 | Stobby |

FOREIGN PATENT DOCUMENTS

| DE | 29616361 | 12/1996 |
| DE | 102004058583 | 6/2006 |
| EP | 0863175 | 9/2001 |
| WO | 2008119059 | 10/2008 |

OTHER PUBLICATIONS

Search report from the corresponding European 10 701 162.9 application, dated Aug. 16, 2016.

* cited by examiner

*Primary Examiner* — John Cooney
(74) *Attorney, Agent, or Firm* — Steven W. Mork

(57) ABSTRACT

Prepare extruded polymer foam comprising at least 50 weight-percent alkenyl aromatic polymer, a brominated flame retardant providing 0.8 to 1.4 weight percent bromide, 0.05 to 0.5 weight-percent hydrobromic acid scavenger, at least 1.5 weight-percent graphite and less than 0.1 weight-percent C—C and O—O labile organic compounds using a blowing agent composition comprising at least 0.3 weight-parts per 100 weight parts polymer and that consists of blowing agents having an ozone depletion potential of zero and a global warming potential that is less than 1000.

15 Claims, No Drawings

POLYMER FOAM WITH LOW BROMINE CONTENT

CROSS REFERENCE STATEMENT

This application claims the benefit of U.S. Provisional Application No. 61/144,767, filed Jan. 15, 2009.

BACKGROUND OF THE INVENTION

Field of the Invention

The present invention relates to extruded polymer foam containing low bromine content and a process for preparing such extruded foam.

Description of Related Art

Extruded polymeric foam typically contains brominated flame retardants in order to achieve an acceptable level of flame resistance. A well known standard for flame resistance is the German B2 fire test according to DIN 4102. Such a flame resistance is particularly desirable for thermally insulating polymeric foams for use in building and construction applications. Brominated flame retardants such as hexabromocyclododecane (HBCD) have increasing restrictions on their use in extruded polymeric foam due to a negative environmental stigma associated with them. Therefore, it is desirable to minimize the level of brominated flame retardants in extruded foam to optimize the perceived environmentally friendly character of the foam.

European patent (EP) 0863175B1 describes a thermally insulated extruded polymeric foam that comprises graphite and a brominated flame retardant. The polymer foam reportedly only passes the German B2 fire test provided the concentration of bromine flame retardant compounds is more than two weight-percent (wt %) or is used in combination with 0.1 to 0.5 wt % of a C—C or O—O labile organic compound. Moreover, the brominated flame retardant must contain at least 70 wt % bromide. Therefore, the teachings of EP0863175B1 indicate that more than 1.4 wt % bromide is require to pass the German B2 fire test unless 0.1 to 0.5 wt % of C—C or O—O labile organic compounds are present.

It is desirable to achieve thermally insulating extruded polymeric foam that passes the German B2 fire tests in without requiring 0.1 to 0.5 wt % of C—C or O—O labile organic compounds and without requiring more than 1.4 wt % bromide.

BRIEF SUMMARY OF THE INVENTION

The present invention meets a need in the art of polymeric foam by providing extruded polymeric foam that passes the German B2 fire test without requiring 0.1 to 0.5 wt % of C—C or O—O labile organic compounds and while comprising 1.4 wt % or less bromide.

Surprisingly, 1.4 wt % or less bromide in combination with a hydrobromic acid scavenger is sufficient to provide extruded polymeric foam with sufficient flame resistance to pass the German B2 fire test of DIN4102, even with less than 0.1 weight-percent, moreover even in an absence of C—C and O—O labile organic compounds based on polymer weight.

Even more surprising, such polymeric foam can pass the German B2 fire test when further comprising up to 1.5 weight parts per hundred parts polymer of flammable blowing agent.

In a first aspect, the present invention is an extruded polymer foam comprising: (a) a polymer matrix wherein greater than 50 weight-percent of all polymers in the polymer matrix are alkenyl aromatic polymers; (b) 0.8 weight-percent or more and 1.4 weight-percent or less of bromide within the polymer matrix based on polymer matrix weight; (c) 0.05 weight-percent or more and 0.5 weight-percent or less of HBr scavenger dispersed within the polymer matrix based on polymer matrix weight; and (d) less than 0.1 weight-percent of C—C and O—O labile organic compounds dispersed in the polymer matrix based on polymer matrix weight.

Certain embodiments of the first aspect can include any one or any combination of more than one of the following further characteristics: the polymer foam has a density that is less than 38 kilograms per cubic meter and further includes cells dispersed within the polymer matrix wherein the average cell size is greater than 100 micrometers; further comprising up to 1.5 weight-percent of a flammable blowing agent based on polymer foam weight; further comprising 0.2 weight parts or more and 0.3 weight parts or less of a hydrobromic acid scavenger; the hydrobromic acid scavenger is an organo-epoxy material; the hydrobromic acid scavenger is a novolac epoxy; the hydrobromic acid scavenger is epoxy cresol novolac; the extruded polymer foam is free of C—C and O—O labile organic compounds; and further comprising up to 1.5 weight-percent or more graphite dispersed within the polymer matrix based on total polymer matrix weight.

In a second aspect, the present invention is a process for preparing an extruded polymer foam comprising the steps: (a) providing a foamable polymer composition having a softening temperature in an extruder at an initial temperature at or above the softening temperature and at an initial pressure that precludes foaming of the polymer composition; (b) exposing the foamable polymer composition to a pressure that is below the initial pressure and that allows the foamable polymer composition to expand into a polymer foam; and; (c) allowing the foamable polymer composition to expand into a polymer foam; wherein, the foamable polymer composition comprises: (i) polymer, at least 50 weight-percent of which is one or more alkenyl aromatic polymer; (ii) a blowing agent composition that comprises water at a concentration of 0.3 weight-parts per 100 weight-parts of polymer and that consists of blowing agents having an ozone depletion potential of zero and a global warming potential that is less than 1000; (iii) brominated flame retardant sufficient to provide 0.8 weight-percent or more and 1.4 weight percent or less bromide based on total polymer weight; (iv) 0.05 weight-percent or more and 0.5 weight-percent or less of a hydrobromic acid scavenger based on total polymer weight; (v) at least 1.5 weight-percent of graphite based on total polymer weight; and (vi) less than 0.1 weight-percent C—C and O—O labile organic compounds based on total polymer weight.

Certain embodiments of the second aspect include any one or any combination of more than one of the following characteristics: the blowing agent comprises a flammable blowing agent; the foamable polymer composition comprises 0.2 weight-percent or more and 0.3 weight-percent or less of a hydrobromic acid scavenger based on total foamable polymer composition weight; the hydrobromic acid scavenger is an organo-epoxy acid scavenger; the hydrobromic acid scavenger is a novolac epoxy; the hydrobromic acid scavenger is epoxy cresol novolac; the foamable polymer composition is free of C—C and O—O labile organic compounds; and the foamable polymer composition comprises up to 1.5 weight-percent graphite based on foamable polymer composition weight.

The process of the present invention is useful for preparing polymeric foam of the present invention. The polymeric foam of the present invention is useful, for example, as thermal insulating material.

DETAILED DESCRIPTION OF THE INVENTION

Hydrobromic acid scavenger (HBr scavenger) refers to materials that react with hydrobromic acid to form covalent carbon-bromine bonds.

Flammable blowing agent refers to a blowing agent having a lower explosive limit in air of five volume-percent or less as determined by ASTM E681-04.

C—C and O—O labile organic compounds are molecules containing C—C or O—O single bonds that homolytically cleave at elevated temperature to leave fragments containing C and O radicals.

Softening temperature of a polymer or polymer composition refers to the temperature at which the polymer (or polymer composition) becomes malleable and transferable in an extruder. It is desirable to consider the softening temperature of an amorphous polymer as being equivalent to the glass transition temperature of the amorphous polymer. If more than one polymer is present in a polymer composition and the polymer composition has a continuous amorphous polymer phase, it is desirable to consider the glass transition temperature of the continuous polymer phase as the softening temperature of the composition. If the polymer is semi-crystalline, or the polymer composition comprises a continuous semi-crystalline phase instead of a continuous amorphous phase, it is desirable to consider the crystallization temperature of semi-crystalline phase as the softening point of the polymer or polymer composition.

Ozone depletion potential (ODP) is a ratio of the impact on ozone of a chemical compared to the impact of a similar mass of CFC-11. Fluorinated hydrocarbons have an ODP of zero since they do not contain chlorine. (see, www.epa.gov/Ozone/defns.html).

Global warming potential (GWP) is a ratio of the warming caused by a substance to the warming caused by a similar mass of carbon dioxide. Hence, carbon dioxide has a GWP of 1.0. Water has a GWP of zero. (see, www.epa.gov/Ozone/defns.html).

ASTM refers to American Society for Testing and Materials. ASTM methods herein either cite a year of the pertinent test method as a hyphenated suffix with the method number or, if there is no hyphenated suffix, are in reference to the most current method as of the date of filing this application. Such is the case for any and all test methods herein.

Use of "and/or" mean "and, or as an alternative to".

Notably, the present process and foam conceives all possible combinations of ranges for each of the components described herein.

The present foam comprises a polymer matrix that itself comprises at least one polymer. The present foam is within a class of extruded polystyrene foam, which means at least 50 weight-percent (wt %) of all the polymers in the polymer matrix are alkenyl aromatic polymers. The polymers in the polymer matrix can be 75 wt % or more, 90 wt % or more, 95 wt % or more and even 100 wt % alkenyl aromatic polymers. Desirably, the alkenyl aromatic polymers are selected from styrenic polymers that include styrenic homopolymer and styrenic copolymers that include styrene monomer units. Foam having a polymer composition where at least 50 wt % of the polymers in the foam are styrenic polymers are commonly known as "extruded polystyrene" foam or "XPS" foam. Particularly desirable styrenic polymers include styrene-acrylonitrile copolymers (SAN). The alkenyl aromatic polymers can be entirely polystyrene homopolymer, a blend of polystyrene homopolymer with a styrenic copolymer at any blend ratio, or entirely a styrenic copolymer such as SAN. Desirably, the alkenyl aromatic polymers are polystyrene homopolymers.

The extruded polymer foam further comprises a brominated flame retardant dispersed within the polymer matrix. Brominated flame retardants include hexabromocyclododecane (HBCD), pentabromobenzyl bromide as well as brominated polymer compounds and other brominated materials known and yet to be known for use in polymer foam. The brominated flame retardant may be a single type of brominated flame retardant or a combination of more than one brominated flame retardant. Brominated flame retardants are present in the extruded polymer foam at a concentration sufficient to provide a bromide (Br) concentration of 1.4 wt % or less based on polymer weight in the foam. The Br concentration can be 1.3 wt % or less, 1.2 wt % or less, or even 1.1 wt % or less based on polymer weight. Desirably, the Br concentration is 0.8 wt % or more, preferably 0.9 wt % or more, still more preferably 1.0 wt % or more and yet more preferably 1.1 wt % or more based on polymer weight. Br concentration includes Br bound to a flame retardant compound as well as any other form of Br. Surprisingly, even with such a low Br concentration foams of the present invention pass the German B2 fire test even when C—C and O—O labile organic compound concentrations are below 0.1 wt % based on polymer weight, and even when C—C and O—O labile organic compounds are absent from the foam.

A hydrobromic acid (HBr) scavenger is present and dispersed in the polymer matrix. The HBr scavenger is desirable when a brominated flame retardant is present in combination with an aqueous blowing agent because of a propensity for HBr formation. HBr is undesirable because it can corrode process equipment and actually accelerate decomposition of flame retardant by increasing the rate of further HBr formation. Suitable HBr scavengers are those compounds that react to form covalent bonds with Br in the presence of HBr. Examples of suitable HBr scavengers include organo-epoxy materials, which are desirable as opposed to inorganic acid scavengers (such as tetrasodium pyrophosphate, TSPP) because organo-epoxy materials are more soluble in polymer than inorganic acid scavengers. A particularly desirable class of organo-epoxy scavengers is novolac epoxy compounds, especially epoxy cresol novolac. Epoxy novolacs and epoxy cresol novolac, is particularly desirable because of their combination of weight-averaged molecular weight (Mw), glass transition temperature (Tg) and high epoxy content. The Mw of epoxy novolacs are relatively high, which renders them more favorable from a product safety standpoint. The Tg of epoxy novolacs is sufficiently high so as to not reduce the Tg of the polymer composition in the polymer foam during fabrication, which can hinder the foaming process. The high epoxy content is desirable in order to efficiently provide stabilizing functionality into the polymer foam. The concentration of HBr scavengers in the polymer foam is desirably 0.05 wt % or more, preferably 0.1 wt % or more, more preferably 0.2 wt % or more and is typically 0.5 wt % or less, more typically 0.3 wt % or less based on total polymer weight.

Often, C—C and/or O—O labile organic compound synergists need to be present in combination with a brominated flame retardant in a polymer foam in order for the polymer foam to meet a German B2 fire classification. Surprisingly, foam of the present invention does not require the presence of C—C and/or O—O labile organic compounds to achieve German B2 fire classification. Presumably, the combination of brominated flame retardant and organo-epoxy HBr scavenger of the present invention provide sufficient flame retardant performance to a polymer foam so as to achieve a German B2 fire classification apart from C—C and/or O—O labile organic compounds. Polymer foams of the present invention have less than 0.1 wt % and can have 0.05 wt % or less, 0.01 wt % or less and can even be free of C—C and O—O labile organic compounds based on total polymer weight.

The polymer foam of the present invention can further comprise graphite dispersed within the polymer matrix and still achieve a German B2 fire classification. Polymeric foam of the present invention can comprise 0.5 wt % or more, even four wt % or more and typically 10 wt % or less of graphite based on polymer matrix weight and still achieve German B2 fire classification. Graphite is a desirable infrared attenuating additive for polymeric foam that reduces the thermal conductivity through the foam presumably by both reflective and absorptive mechanisms. Therefore, achieving a German B2 fire classification is valuable for graphite containing polymer foam for use in thermal insulation applications.

The polymer foam may further contain other additives common to polymeric foam. It is desirably to avoid adding carbon black because carbon black tends to reduce the ability of foam to achieve a B2 rating in the German B2 fire test according to DIN 4102.

The polymer foam comprises a multitude of cells dispersed within the polymer matrix. Desirably, the polymer foam has an average cell size of 0.05 millimeters (mm) or more, preferably 0.1 mm or more, still more preferably 0.15 mm or more and desirably 1.0 mm or less, preferably 0.7 mm or less and most preferably 0.25 mm or less. Determine cell size according to ASTM method D6226.

The polymer foam desirably has a density of less than 64 kilograms per cubic meter ($kg/m^3$), preferably 48 $kg/m^3$ or less, still more preferably 40 $kg/m^3$ or less and yet more preferably 38 $kg/m^3$ or less. Lower density foams are desirable for lower cost and ease of handling. However, it is desirable for the polymer foam to have density of 16 $kg/m^3$ or more in order to achieve mechanical integrity. Determine foam density according to ASTM method D1622-08.

Polymer foams of the present invention may further contain residual blowing agent. Surprisingly, polymer foams of the present invention may even contain flammable blowing agent and still achieve German B2 classification in fire performance. Desirably, flammable blowing agents are present at a concentration of 1.5 wt % or less, preferably one wt % or less, more preferably 0.5 wt % or less, even more preferably 0.1 wt % or less and most preferably are absent from the polymer foam in order to optimize performance in flame retardancy testing. Wt % is based on total polymer weight.

Prepare polymer foams of the present invention by an extrusion process. In general, prepare a polymer foam using an extrusion process by providing a foamable polymer composition having a softening temperature in an extruder at an initial temperature at or above the softening temperature and at an initial pressure that precludes foaming of the polymer composition; exposing the foamable polymer composition to a pressure that is below the initial pressure and that allows the foamable polymer composition to expand into a polymer foam; and then allowing the foamable polymer composition to expand into a polymer foam. The process of the present invention encompasses any extrusion process for preparing foam and is characterized primarily by the foamable composition. It can be desirable to cool a foamable polymer composition from its initial temperature prior to allowing the foamable composition to expand into foam. Exposing the foamable composition to a pressure lower than the initial pressure often occurs through an extrusion die wherein the foamable composition travels through one or more than one orifice into a zone of lower pressure (typically atmospheric pressure) and then expands. The orifice or orifices can be of any conceivable shape. A single rectangular orifice is common to prepare foam boards or sheets. Multiple orifices are common to form coalesced strand foam structures.

The foamable composition comprises a polymer and a blowing agent. The polymer and any additional additives dispersed within the polymer form the polymer matrix of the resulting polymer foam—the polymer foam of the present invention.

The polymer can be a single polymer or a combination of more than one polymer. At least 50 weight-percent (wt %) of all the polymers are alkenyl aromatic polymers. The polymer can be 75 wt % or more, 90 wt % or more, 95 wt % or more and even 100 wt % alkenyl aromatic polymers. Desirably, the alkenyl aromatic polymers are selected from styrenic polymers that include styrenic homopolymer and styrenic copolymers that include styrene monomer units. Particularly desirable styrenic copolymers include styrene-acrylonitrile copolymers (SAN). The alkenyl aromatic polymers can be entirely polystyrene homopolymer, a blend of polystyrene homopolymer with a styrenic copolymer at any blend ratio, or entirely a styrenic copolymer such as SAN. Desirably, the alkenyl aromatic polymers are polystyrene homopolymers.

The foamable composition further comprises a blowing agent composition. Water is present in the foamable composition at a concentration of 6 wt % or more and can be present at a concentration of 10 wt % or more and even 14 wt % or more based on total blowing agent weight. Water generally accounts for 75 wt % or less of the totable blowing agent composition weight. Typically, water is present in the foamable polymer composition at a concentration of 0.3 weight-parts or more, more typically 0.5 weight-parts or more and usually 0.7 weight-parts or less based on 100 weight-parts of polymer. The amount of water includes water added directly to the foamable composition and adsorbed or absorbed water that enters the foamable composition with other components.

Carbon dioxide is also desirably present in the blowing agent composition. Carbon dioxide is typically present at a concentration of 2.5 weight-parts or more and 1.0 weight-part or less based on 100 weight-parts of polymer. The blowing agent can contain less than 50 wt % carbon dioxide based on total blowing agent weight.

The blowing agent composition may further contain any one or combination of more than one of further blowing agent including hydrocarbons having from 3 to 5 carbons (for example, propane isomers, isobutane, isopentane, n-pentane, and n-butane), fluorinated hydrocarbons having from 2 to 5 carbons including hydrofluorocarbons and fluorocarbons, alcohols having form one to 4 carbons, and ketones and ethers having from 2 to 4 carbons.

Desirably, the blowing agent composition consists of blowing agents that have an ozone depletion potential (ODP) of zero. It is further desirable if the blowing agent composition consists of blowing agents that have a global warming potential (GWP) that is less than 1000. A blowing agent composition that has a zero ODP and a GWP that is less than 1000 is desirable to minimize negative environmental impact of the present process on the environment The total amount of blowing agent in the foamable composition is typically four wt % or more and 12 wt % or less based on total polymer weight.

The foamable composition further comprises a brominated flame retardant, HBr scavenger and graphite as described and in concentrations as described for the polymer foam of the present invention. The foamable composition also can comprise C—C and O—O labile organic compounds but only to the extent described for the polymer foam of the present invention. Similarly, the foamable composition may comprise additional additives as described for the polymer foam. In both the polymer foam and process, the concentration ranges for brominated flame retardant, HBr scavenger, graphite, C—C and O—O labile organic compounds and additional additives are relative to total polymer weight.

The following examples serve to illustrate embodiments of the present invention and not necessarily to limit the scope of the present invention.

EXAMPLES

Introduce polystyrene resin (a blend of 80 wt % PS64 having 135000 Mw and 20 wt % PS680 having 196000 Mw) into a single screw extruder together with barium stearate (0.23 parts per hundred or "pph"), epoxy cresol novolac resin (0.25 pph; ARALDITE™ ECN 1280, ARALDITE is a trademark of Huntsman Advanced materials Americas Inc. Corporation), polyethylene resin (0.4 pph) and HBCD (1.5 pph), where pph are weight parts per hundred weight parts polystyrene. Add one to 1.5 weight percent graphite as a polystyrene concentrate (UF1 98C from Graphit Kropfmuehl; mean particle size is 300 nanometers), with weight percent based on total polystyrene weight. Heat the combination of components so as to melt the polystyrene and mix the components to form an essentially homogeneous composition.

Inject a blowing agent composition into the homogeneous composition to form a foamable composition at a pressure above 90 bar. The blowing agent composition consists of carbon dioxide (3 pph), isobutane (1.5 pph) and water (0.5 pph), where pph is weight parts per hundred weight parts polystyrene.

Cool the foamable composition to 125° C. and foam through a slit die into atmospheric pressure. Prepare three different foams of three different thicknesses.

Table 1 contains a characterization of three exemplary foams prepared in this manner. Weight-percent (wt %) is relative to polymer weight.

TABLE 1

| Characterization | Example 1 | Example 2 | Example 3 |
|---|---|---|---|
| Foam thickness (mm) | 60 | 80 | 120 |
| Foaming Rate (kg/hr) | 1750 | 1750 | 1700 |
| Graphite (wt %) | 1.5 | 1.5 | 1.0 |
| Bromide (wt %) | 1.1 | 1.1 | 1.2 |
| Residual Iso-Butane (wt %) | 1.3–1.4 | 1.3–1.4 | 1.3–1.4 |
| Density (kg/m$^3$) | 35.1 | 36.3 | 38.2 |
| Average Cell Size (mm) | 0.11 | 0.11 | 0.14 |
| German B2 Flame Test | Pass | Pass | Pass |
| EN11925-2 Ignitability Test | Pass | Pass | Pass |

Examples 1-3 are extruded polymer foams of the present invention that illustrate the surprising result of achieving German B2 flame test characterization while containing 1.4 wt % or less bromide and with an absence of C—C and O—O labile organic compounds. Moreover, the exemplary foams were prepared using a blowing agent composition that consists of blowing agents having zero ODP and GWP values below 1000. Still more surprising is that the foams achieved the German B2 characterization while containing residual flammable blowing agents (iso-butane).

The invention claimed is:

1. An extruded polymer foam comprising:
    a. a polymer matrix wherein greater than 50 weight-percent of all polymers in the polymer matrix are alkenyl aromatic polymers;
    b. 0.8 weight-percent or more and 1.4 weight-percent or less of bromide within the polymer matrix based on polymer matrix weight;
    c. 0.05 weight-percent or more and 0.5 weight-percent or less of a hydrobromic acid scavenger dispersed within the polymer matrix based on polymer matrix weight; and
    d. less than 0.1 weight-percent of C—C and O—O labile organic compounds dispersed in the polymer matrix based on polymer matrix weight; and
    e. 0.5 weight-percent or more and up to 1.5 wt % graphite dispersed within the polymer matrix based on total polymer matrix weight;
and characterized by the extruded polymer foam passing the German B2 fire test of DIN 4102.

2. The extruded polymer foam of claim 1, wherein the polymer foam has a density that is less than 38 kilograms per cubic meter and further includes cells dispersed within the polymer matrix wherein the average cell size is greater than 100 micrometers.

3. The extruded polymer foam of claim 1, further comprising up to 1.5 weight-percent of a flammable blowing agent based on polymer foam weight.

4. The extruded polymer foam of claim 1, comprising 0.2 weight parts or more and 0.3 weight parts or less of a hydrobromic acid scavenger.

5. The extruded polymer foam of claim 1, wherein the hydrobromic acid scavenger is an organo-epoxy material.

6. The extruded polymer foam of claim 1, wherein the hydrobromic acid scavenger is a novolac epoxy.

7. The extruded polymer foam of claim 1, wherein the hydrobromic acid scavenger is epoxy cresol novolac.

8. The extruded polymer foam of claim 1, wherein the extruded polymer foam is free of C—C and O—O labile organic compounds.

9. A process for preparing an extruded polymer foam comprising the steps:
    a. providing a foamable polymer composition having a softening temperature in an extruder at an initial temperature at or above the softening temperature and at an initial pressure that precludes foaming of the polymer composition;
    b. exposing the foamable polymer composition to a pressure that is below the initial pressure and that allows the foamable polymer composition to expand into a polymer foam; and
    c. allowing the foamable polymer composition to expand into a polymer foam;
wherein, the foamable polymer composition comprises:
    (i) polymer, at least 50 weight-percent of which is one or more alkenyl aromatic polymer;

(ii) a blowing agent composition that comprises water at a concentration of 0.3 weight-parts or more per 100 weight-parts of polymer and that consists of blowing agents having an ozone depletion potential of zero and a global warming potential that is less than 1000;
(iii) brominated flame retardant sufficient to provide 0.8 weight-percent or more and 1.4 weight percent or less bromide based on total polymer weight;
(iv) 0.05 weight-percent or more and 0.5 weight-percent or less of a hydrobromic acid scavenger based on total polymer weight;
(v) 0.5 weight-percent or more and 1.5 weight-percent or less of graphite based on total polymer weight; and
(vi) less than 0.1 weight-percent C—C and O—O labile organic compounds based on total polymer weight;

and characterized by the polymer foam passing the German B2 fire test of DIN 4102.

10. The process of claim 9, wherein the blowing agent comprises a flammable blowing agent.

11. The process of claim 9, wherein the foamable polymer composition comprises 0.2 weight-percent or more and 0.3 weight-percent or less of a hydrobromic acid scavenger based on total foamable polymer composition weight.

12. The process of claim 9, wherein the hydrobromic acid scavenger is an organo-epoxy acid scavenger.

13. The process of claim 9, wherein the hydrobromic acid scavenger is a novolac epoxy.

14. The process of claim 9, wherein the hydrobromic acid scavenger is epoxy cresol novolac.

15. The process of claim 9, wherein the foamable polymer composition is free of C—C and O—O labile organic compounds.

\* \* \* \* \*